UNITED STATES PATENT OFFICE.

EDUARD LAMPÉ, OF FRANKFORT-ON-THE-MAIN, GERMANY, ASSIGNOR TO FARBENFABRIKEN VORM. FRIEDR. BAYER & CO., OF ELBERFELD, GERMANY, A CORPORATION OF GERMANY.

FOOD FOR DIABETICS.

980,292.   Specification of Letters Patent.   Patented Jan. 3, 1911.

No Drawing.   Application filed August 4, 1910.   Serial No. 575,397.

*To all whom it may concern:*

Be it known that I, EDUARD LAMPÉ, doctor of medicine, citizen of the German Empire, residing at Frankfort-on-the-Main, Germany, have invented new and useful Improvements in Food for Diabetics, of which the following is a specification.

The present invention relates to the manufacture and production of a new food, which is free from all substances harmful to diabetics.

For producing this new material soybeans are freed from the shells and then treated with boiling water until a pulpy mass is obtained. This process is advantageously carried out by the addition of such chemicals as bicarbonate of soda, a good method being the addition of 300 g. of bicarbonate of soda to 60 kg. soybeans. By the treatment with boiling water the carbohydrates and other water soluble substances are dissolved away and a product is obtained which after being dried and pulverized is a yellowish powder insoluble in water, retaining the nutritive fatty and albuminoid substances, but free from carbohydrates which renders it valuable as a food for diabetics.

I claim:

A product obtained from soy-beans which after being dried and pulverized is a yellowish powder insoluble in water, retaining the nutritive fatty and albuminoid substances, but free from carbohydrates which renders it valuable as a food for diabetics, substantially as described.

In testimony whereof I have hereunto set my hand in the presence of two subscribing witnesses.

EDUARD LAMPÉ.

Witnesses:
  JEAN GRUND,
  CARL GRUND.